(12) United States Patent
Goebel et al.

(10) Patent No.: US 12,037,057 B2
(45) Date of Patent: Jul. 16, 2024

(54) STEER-BY-WIRE STEERING GEAR WITH COUPLING ROD SUPPORTED ON A PRESSURE PIECE

(71) Applicants: thyssenkrupp Presta AG, Eschen (LI); thyssenkrupp AG, Essen (DE)

(72) Inventors: Tobias Goebel, Dornbirn (AT); Daniel Kreutz, Feldkirch (AT); Bernhard Marte, Klaus (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 663 days.

(21) Appl. No.: 17/274,484

(22) PCT Filed: Sep. 19, 2019

(86) PCT No.: PCT/EP2019/075128
§ 371 (c)(1),
(2) Date: Mar. 9, 2021

(87) PCT Pub. No.: WO2020/064491
PCT Pub. Date: Apr. 2, 2020

(65) Prior Publication Data
US 2022/0111887 A1     Apr. 14, 2022

(30) Foreign Application Priority Data

Sep. 24, 2018   (DE) .................... 10 2018 123 424.4

(51) Int. Cl.
*B62D 5/04*       (2006.01)
*B62D 5/00*       (2006.01)
(52) U.S. Cl.
CPC ........... *B62D 5/0448* (2013.01); *B62D 5/006* (2013.01); *B62D 5/0463* (2013.01)

(58) Field of Classification Search
CPC ..... B62D 5/0448; B62D 5/006; B62D 5/0463
See application file for complete search history.

(56) References Cited

U.S. PATENT DOCUMENTS

2006/0185460 A1   8/2006  Shiino et al.
2012/0097473 A1   4/2012  Tashiro
(Continued)

FOREIGN PATENT DOCUMENTS

CN       102452412 A    5/2012
CN       105984487 A   10/2016
(Continued)

OTHER PUBLICATIONS

English Translation of International Search Report issued in PCT/EP2019/075128, dated Dec. 16, 2019.

*Primary Examiner* — Jacob D Knutson
(74) *Attorney, Agent, or Firm* — thyssenkrupp North America, LLC

(57) ABSTRACT

A steering gear for a steer-by-wire steering system of a motor vehicle may include a coupling rod which is supported in a steering gear housing and on which a threaded spindle is formed, with the threaded spindle being surrounded by a spindle nut. The threaded spindle and the spindle nut may be part of a helical gearing, and the coupling rod is movable along a longitudinal axis by way of the helical gearing. The coupling rod is movably mounted in the steering gear housing along the longitudinal axis by way of a pressure piece having two bearing elements arranged on opposite sides of the coupling rod in a circumferential direction of the longitudinal axis.

14 Claims, 3 Drawing Sheets

(56) References Cited

U.S. PATENT DOCUMENTS

| | | |
|---|---|---|
| 2012/0298439 A1 | 11/2012 | Ji et al. |
| 2016/0075368 A1 | 3/2016 | Watanabe et al. |
| 2017/0029013 A1 | 2/2017 | Oya |
| 2021/0171090 A1 | 6/2021 | Raither et al. |

FOREIGN PATENT DOCUMENTS

| | | | | |
|---|---|---|---|---|
| CN | 112566834 A | | 3/2021 | |
| DE | 19937253 A1 | * | 2/2001 | ............. B62D 3/123 |
| DE | 10 2006 008 269 A | | 8/2006 | |
| DE | 102006008269 A1 | * | 8/2006 | ............. B62D 3/123 |
| DE | 10 2008 002 176 A | | 12/2009 | |
| DE | 10 2008 043 116 A | | 4/2010 | |
| DE | 102011075496 A1 | * | 11/2012 | ............. B62D 3/123 |
| DE | 10 2011 109 906 A | | 2/2013 | |
| DE | 10 2012 019 654 A | | 4/2014 | |
| DE | 10 2017 103 975 A | | 8/2018 | |
| DE | 102017103975 A1 | * | 8/2018 | |
| DE | 102019208451 A1 | * | 12/2020 | |
| EP | 3 159 244 A | | 4/2017 | |
| EP | 3159244 A1 | * | 4/2017 | ........... B62D 15/027 |
| JP | 2003146227 A | | 5/2003 | |
| KR | 20060002150 A | * | 1/2006 | ........... B62D 5/0472 |
| WO | 2014/056571 A | | 4/2014 | |

\* cited by examiner

STEER-BY-WIRE STEERING GEAR WITH COUPLING ROD SUPPORTED ON A PRESSURE PIECE

CROSS REFERENCE TO RELATED APPLICATIONS

This application is a U.S. National Stage Entry of International Patent Application Serial Number PCT/EP2019/075128, filed Sep. 19, 2019, which claims priority to German Patent Application No. DE 10 2018 123 424.4, filed Sep. 24, 2018, the entire contents of both of which are incorporated herein by reference.

FIELD

The present disclosure generally relates to steer-by-wire steering systems of motor vehicles and to steering gears for steer-by-wire steering systems.

BACKGROUND

In steer-by-wire steering systems, the position of the steered wheels is not directly coupled to the steering input means, for example a steering wheel. A connection is present between the steering wheel and the steered wheels via electrical signals. The driver's steering request is tapped by a steering angle sensor and the position of the steered wheels is controlled via a steering adjuster as a function of the driver's steering request.

In electromechanical steering gears, an anti-rotation protection and bearing arrangement of the coupling rod is provided by the cooperation of a rack and pinion steering gear with a pressure piece which presses the steering rack against a pinion.

A rack and pinion steering gear in which a steering rack is engaged with a pinion is disclosed in the published patent application DE 10 2008 043 116 A1, wherein a pressure piece presses the steering rack against the pinion by pretensioning. In order to set the spring pretensioning, the play of the pressure piece is set via an adjusting screw. The published patent application DE 10 2012 019 654 A1 discloses a rack and pinion steering gear having a bearing bush which surrounds the steering rack over the periphery thereof and which is arranged in the toothed region. A sliding shell is provided inside the bearing shell, the steering rack being supported on said sliding shell. The pretensioning of the bearing shell is implemented via an adjusting screw.

By eliminating the rack and pinion steering gear in steer-by-wire steering systems, a new solution for a bearing arrangement and an anti-rotation protection of the coupling rod has to be developed.

Thus, a need exists for a steering gear for a steer-by-wire steering system of a motor vehicle which has improved bearing and anti-rotation protection for a coupling rod and which is also simple to mount.

DETAILED DESCRIPTION

Figure 1:
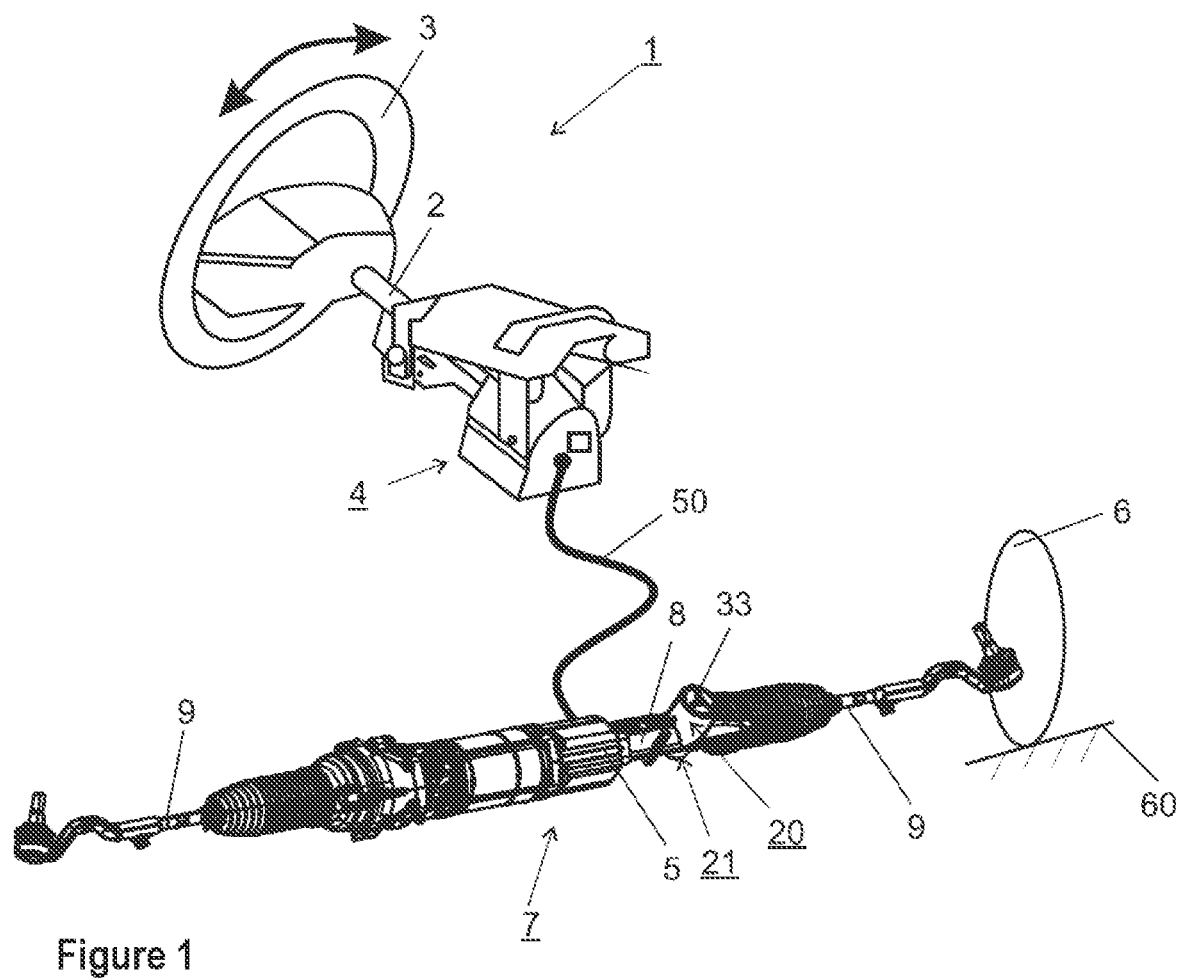
FIG. 1 is a schematic view of an example steer-by-wire steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Accordingly, a steering gear for a steer-by-wire steering system of a motor vehicle is disclosed, having a coupling rod which is supported in a steering gear housing, wherein the coupling rod can be moved along the longitudinal axis, and wherein the coupling rod is movably mounted in the steering gear housing along a longitudinal axis by means of a pressure piece, wherein the pressure piece has two bearing elements which are arranged on opposite sides of the coupling rod in the circumferential direction of the longitudinal axis, preferably diametrically to the coupling rod. The two bearing elements represent a simple bearing arrangement of the coupling rod. Preferably, a threaded spindle is formed on the coupling rod, said threaded spindle being surrounded by a spindle nut, wherein the threaded spindle and the spindle nut are part of a helical gearing. The coupling rod preferably has no toothing. Preferably the coupling rod has at least two sliding surfaces which are positioned on counter sliding surfaces in the pressure piece. Accordingly, the coupling rod may also be configured as a steering rack.

Preferably at least one of the two bearing elements is adapted to a non-circular profile shape of the coupling rod so that the pressure piece forms an anti-rotation protection. Preferably one of the two bearing elements is configured to be planar or straight on the two front faces so that a straight cylinder is formed. The bearing elements are thus designed such that the coupling rod is held in rotation by a positive connection and is axially movable. It is advantageous if at least one of the bearing elements has a sliding element on the contact surface between the bearing element and the coupling rod. Preferably the two bearing elements have a sliding element. It may be provided that the sliding element surrounds the bearing element over the entire circumference, preferably as a sleeve, or only extends over the contact surface which has a lower coefficient of friction than the bearing element. The sliding element is preferably an insert film which is positioned on the contact surface as a thin, friction-reducing layer. It consists of a PTFE-coated sliding bronze layer. The arrangement of the sliding element may be predetermined by an anti-rotation device, in particular with non-rotational symmetry. Preferably the contact surface between one of the bearing elements and the coupling rod is designed to be planar. The sliding element is preferably arranged on one of the front faces of the bearing element which faces the coupling rod, such that it does not project over the bearing element. The sliding element is preferably configured as a thin, friction-reducing layer on the contact surface or is further preferably positioned as an insert film in the bearing element.

Preferably the sliding element has lubrication pockets for lubricating oil.

In a preferred embodiment, the sliding element is connected positively, further preferably in a force-fitting manner, to the corresponding bearing element via a plug connection. To this end, the sliding element has on the side facing the bearing element a pin or a different protruding structure which may be pressed into a corresponding bore of the bearing element.

Advantageously the steering gear comprises an adjusting device which is in abutment with a bearing element of the pressure piece, wherein the bearing element is movable by means of the adjusting device in the radial direction toward the coupling rod and the adjusting device pretensions the bearing element. As a result, the play of the sliding disk-bearing arrangement may be set.

Preferably, for receiving the pressure piece, the steering gear housing has a dome extending in the radial direction and, aligned with the dome, a recess on an inner face opposing the dome, wherein a first bearing element of the pressure piece is located in the recess and a second bearing element of the pressure piece is received in the dome, more specifically in a dome-like opening. The first bearing element may be mounted by the dome in the gear housing. As a result, the housing may be highly simplified. The mounting of the second bearing element is carried out in a manner similar to the mounting of a conventional one-sided pressure piece, already known from electromechanical steering systems. The recess is preferably configured as a blind hole. It is also conceivable and possible that the second bearing element is configured in a continuous opening, wherein the second bearing element may be moved by means of an adjusting device in the direction of the coupling rod, in a manner analogous to the first bearing element.

Preferably the first and the second bearing element are substantially circular-cylindrical.

It is advantageously provided that a threaded spindle of a helical gearing is configured on a first end region of the coupling rod, and the coupling rod is movably mounted in the steering gear housing by means of the pressure piece, in a second end region opposing the first end region along the longitudinal axis.

Preferably the profile of the coupling rod in the second end region is non-circular and the diameter of the profile in this region is smaller than the diameter of the profile of the coupling rod in the remaining region. The term "non-circular" in this definition means that the bottom surfaces are not circles. The coupling rod in the second end region in which the pressure piece is arranged may be configured as a regular or irregular polygon and/or as a polygon or as a polygonal profile.

In an advantageous embodiment, one of the bearing elements is configured in a substantially V-shaped manner on the side near to the coupling rod, so as to correspond to the profile of the coupling rod, and thus forms the anti-rotation protection.

Preferably the helical gearing is a ball screw drive.

Moreover, a steer-by-wire steering system for a motor vehicle is provided, comprising:
a steering gear acting on the steered wheels,
a control unit,
a feedback actuator which may be acted upon via a steering input means by a driver with a driver's request for a steering angle and which outputs a feedback signal to the steering input means as a reaction to the driver's request and a driving state of the motor vehicle,
a device for signal transmission which transmits the driver's request to the control unit,
wherein the control unit controls the steering gear in order to transform the driver's request into a deflection of the steered wheels and wherein the steering gear is configured as described above. In this case it is advantageous if the coupling rod is connected to tie rods for steering the wheels of the motor vehicle.

Whilst the solution according to the invention is preferably used in a steer-by-wire steering system, it is conceivable and possible that this solution may be implemented in an electromechanical steering device.

A steer-by-wire steering system 1 is shown in FIG. 1. A rotation angle sensor, not shown, which detects the driver's steering angle applied by rotating a steering input means 3, which is configured in the example as a steering wheel, is attached to a steering shaft 2. However, additionally a steering torque may also be detected. A joy stick may serve as the steering input means. Moreover, a feedback actuator 4, which serves to simulate the feedback from the road 60 to the steering wheel 3 and thus to provide the driver with feedback about the steering and driving behavior of the vehicle, is attached to the steering shaft 2. The driver's steering request is transmitted to a feedback actuator monitoring unit, not shown, via the rotation angle of the steering shaft 2 measured by the rotation angle sensor. The feedback actuator monitoring unit transmits the driver's steering request to a control unit. The feedback actuator monitoring unit preferably also controls the feedback actuator 4. The feedback actuator monitoring unit may also be configured integrally with the control unit. As a function of the signal of the rotation angle sensor and further input variables, the control unit controls an electrical steering actuator 5 which controls the position of the steered wheels 6. The steering actuator 5 is part of a steering gear 7 comprising a coupling rod which is movably mounted in a steering gear housing 8. The coupling rod acts directly on the steered wheels 6 via tie rods 8 and other components.

Figure 2:
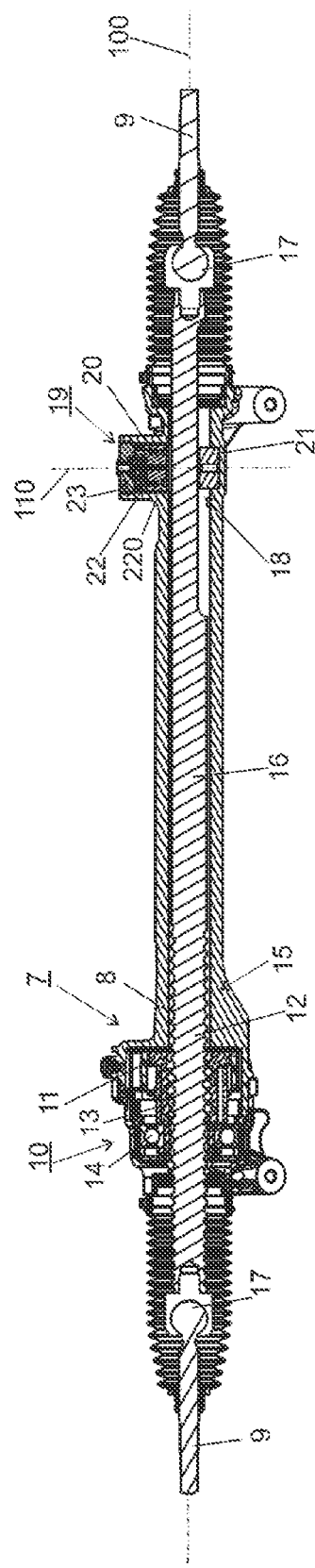
FIG. 2 is a longitudinal sectional view through an example steering gear with a coupling rod and ball screw drive.

FIG. 2 shows a longitudinal section through a steering gear 7 according to the invention with a drivable ball screw drive 10. A ball nut 11 is arranged coaxially to the longitudinal axis 100 and is penetrated by a ball screw spindle 12 coaxially to the longitudinal axis 100. A torque may be transmitted from the ball nut 11 via balls 13 to the ball screw spindle 12. The ball nut 11 is rotatably mounted by means of a ball bearing 14 in the steering gear housing 8. A rotational movement of the ball nut 11 is transferred into a translational movement of the ball screw spindle 12 along the longitudinal axis 100.

The ball screw spindle 12 is configured on a first end region 15 of a coupling rod 16, which at the ends thereof is connected in each case to a tie rod 9 by means of a ball joint 17. The coupling rod 16 is movably mounted in the steering gear housing 8 along the longitudinal axis 100 by means of a pressure piece 19 in a second end region 18 opposing the first end region. The pressure piece 19 has two bearing elements 20, 21 which are arranged on opposite sides, diametrically to the coupling rod 16, in the circumferential direction of the longitudinal axis 100. In the second end region 18, the coupling rod 16 has in cross section a non-circular profile which in cooperation with the pressure piece 19 forms an anti-rotation protection. The steering gear housing 8 has a dome-like opening 22 for receiving the pressure piece 19. A bearing element 20 of the pressure piece 19 is moved by means of an adjusting device 23 in the direction of the longitudinal axis 110, shown in dashed-dotted lines, toward the coupling rod 16.

Figure 3:
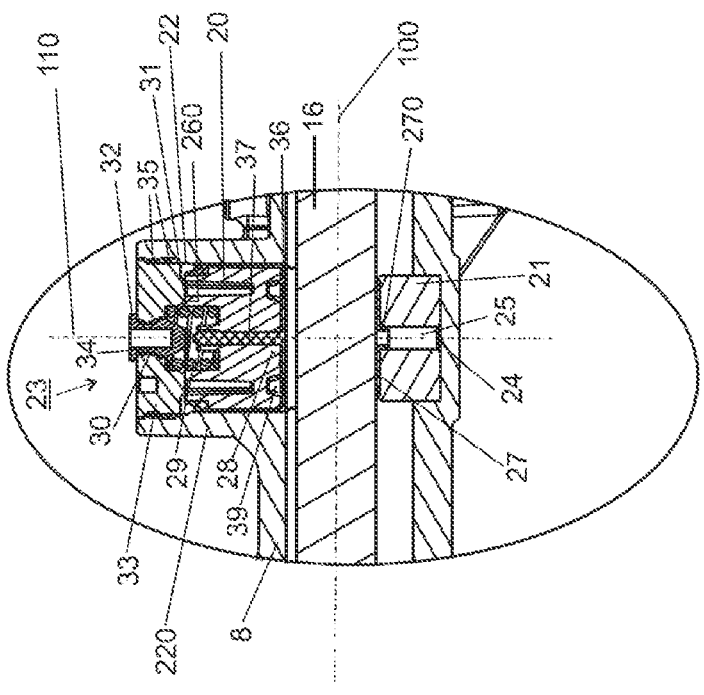
FIG. 3 is an exploded view of an example pressure piece for a bearing arrangement of a coupling rod.
Figure 5:
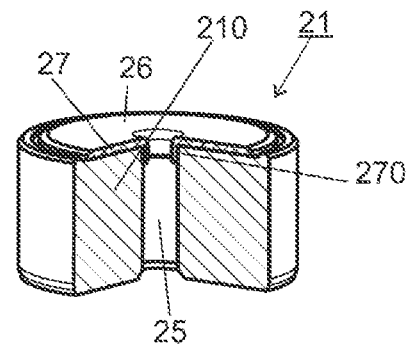
FIG. 5 is a cutaway view of an example first bearing element of a pressure piece.

The pressure piece 19 arranged in the steering gear housing 8 with the adjusting device 23 is shown in detail in FIG. 3. In alignment with the dome 220, the housing 8 has on an inner face opposing the dome 220 a recess 24 for receiving a first bearing element 21. The first bearing element 21 is cylindrically shaped, as shown in detail in FIG. 5. The first bearing element has a centrally penetrating bore 25. The first bearing element 21 is configured to be planar or straight-surfaced on the front faces thereof. The contact surface 26 between the first bearing element 21 and the coupling rod 16 is of planar design. The first bearing element 21 substantially describes a straight cylinder, wherein one of the front faces lies against the coupling rod 16. The front face which lies against the coupling rod 16 has a circular projection on the outside. In the region in abutment with the first bearing element 21, the coupling rod 16 is configured in a manner which corresponds to the first bearing element 21. A sliding element 27 which is positively connected to the first bearing element 21 via a plug connection is provided. To this end, the sliding element 27 on the side facing the bearing element has a pin 270 or another protruding structure which is pressed into the bore 25 of the first bearing element. The sliding element 27 extends over a large part of the contact surface 26 and in this case is only configured on the contact surface 26 between the first bearing element 21 and the coupling rod 16. The sliding element 27 preferably does not protrude over the projection of the first bearing element 21. The base body of the bearing element 21 is configured as a sheet metal element, the sliding element 27, which has a lower coefficient of friction than the base body, being arranged thereon on the contact surface 26. In the embodiment shown, the sliding element 27 is an insert film which is positioned as a thin, friction-reducing layer on the contact surface 26. The insert film consists of a PTFE-coated sliding bronze layer. The arrangement of the sliding element 27 may be predetermined via an anti-rotation device, not shown.

The diameter of the profile of the coupling rod 16 in the second end region 18 is smaller than the diameter of the coupling rod 16 in the remaining region. The coupling rod 16 is narrowed so that the first bearing element of the pressure piece 21 has space in the steering gear housing 8 and the non-circular profile of the coupling rod 16 may be formed.

Figure 4:
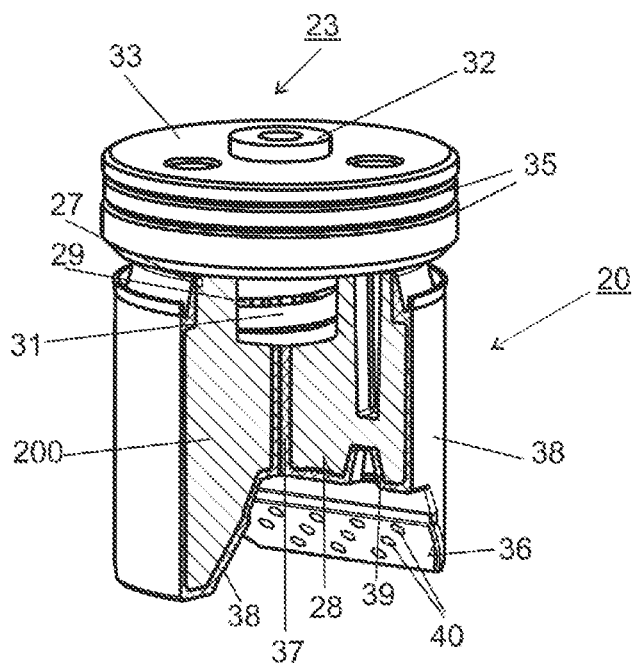
FIG. 4 is a cutaway view through an example pressure piece.

The second bearing element 20 of the pressure piece 19 also has a cylindrical basic shape and thus a circular cross section. The second bearing element is shown in detail in FIG. 4.

In the known manner, the second bearing element 20 has a recess 29 comprising a pin-like element 30 on a first front face 260 which is remote from the coupling rod and which opposes a second front face 28. These components serve as the seat for a coil spring 31 which is part of the adjusting device 23. The adjusting device 23 further comprises an adjusting screw 32 and an adjusting element 33. The adjusting element 33 is in abutment with the second bearing element 20 on the first front face 260. The adjusting element 33 has a penetrating threaded bore 34, the adjusting screw 32 being able to be screwed therein from the outside, moving in the direction of the coupling rod 16. The adjusting screw 32 presses against the coil spring 31, which protrudes into the adjusting element 33, so that by means of the adjusting device 23 the pressure between the pressure piece and the coupling rod 16 may be preset and/or reset in the neutral position. In the longitudinal direction, the adjusting element 33 has two circumferential recesses 35, in an upper region as far as the central region, for receiving annular damping elements (in this case: an O-ring). These damping elements also serve for minimizing the radial play, in addition to the damping of the movement.

The second bearing element 20, on its second side 28 near to the coupling rod, has a contact surface 36 which is adapted to the non-circular profile of the coupling rod 16 in the second end region 18. A sliding element 38 is pressed into a centrally penetrating bore 37. The sliding element 38 covers the contact surface 36 entirely and also encloses the second bearing element 20 in the region of the lateral surface. The sliding element 38 in the region of the second side 28 of the second bearing element 20 is pressed in a recess 39 spaced apart from the bore 37 to form an anti-rotation protection. The sliding element 38 has lubrication pockets 40 for receiving lubricating oil.

Figure 6:
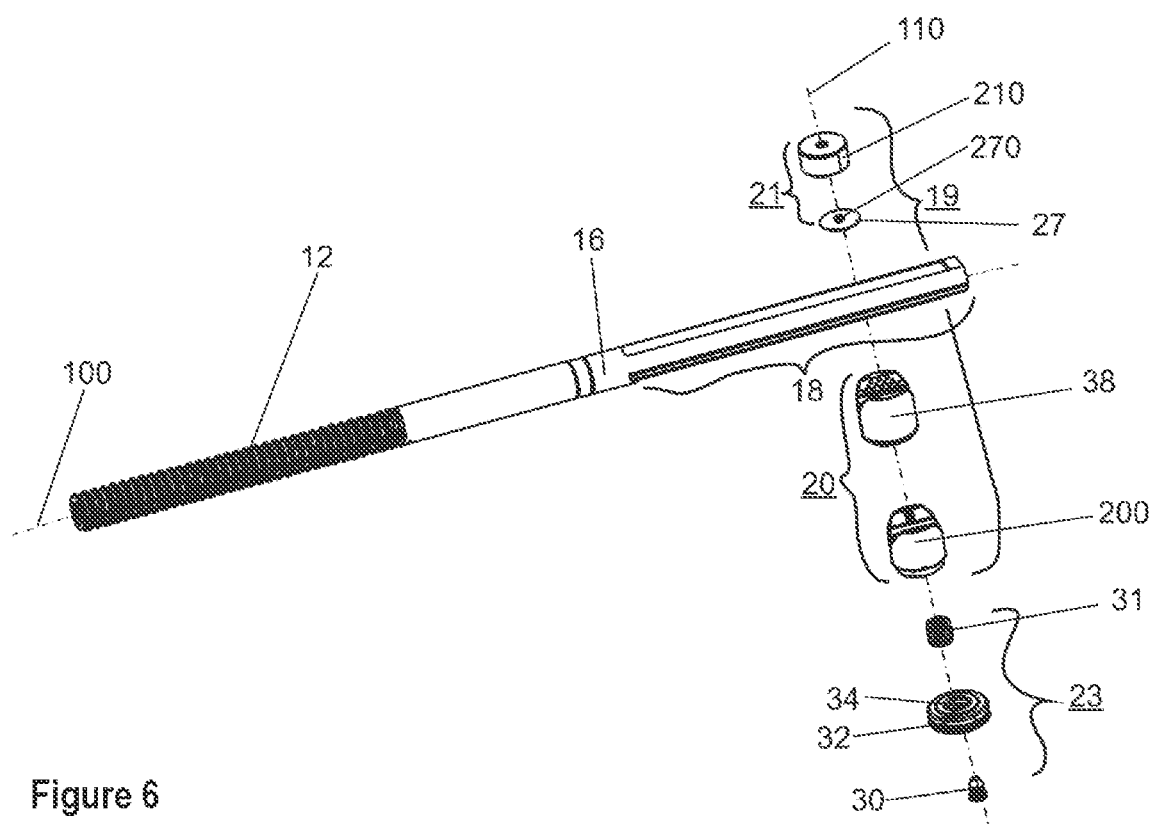
FIG. 6 is a perspective view of an example second bearing element of a pressure piece.

FIG. 6 shows the individual components of the pressure piece 19 and the adjusting device 23 in an exploded drawing. The two bearing elements 20, 21 are adapted to the profile shape of the coupling rod 16. The second bearing element 20 is configured in a substantially V-shaped manner on the side near to the coupling rod. Other shapes which permit a positive geometry and protect against rotation are also conceivable. In the second end region 18 which extends over the entire adjustment path of the coupling rod relative to the pressure piece 19, the coupling rod 16 is located exclusively on the two sliding surfaces of the opposing sliding elements 26, 38. The coupling rod is movably mounted along the longitudinal axis 100.

What is claimed is:

1. A steering gear for a steer-by-wire steering system of a motor vehicle, the steering gear comprising:
   a pressure piece that includes two bearing elements;
   a coupling rod movably mounted in a steering gear housing along a longitudinal axis by way of the pressure piece, wherein the two bearing elements of the pressure piece are disposed on opposite sides of the coupling rod in a circumferential direction of the longitudinal axis; and
   wherein for receiving the pressure piece the steering gear housing includes:
   a dome that extends in a radial direction; and
   a recess that is aligned with the dome, the recess being disposed on an inner face that opposes the dome,
   wherein a first bearing element of the two bearing elements is disposed in the recess and a second bearing element of the two bearing elements is received in the dome.

2. The steering gear of claim 1 wherein at least one of the two bearing elements is adapted to a non-circular profile shape of the coupling rod so that the pressure piece provides anti-rotation protection.

3. The steering gear of claim 1 wherein at least one of the two bearing elements includes a sliding element on a contact surface between the respective bearing element and the coupling rod.

4. The steering gear of claim 3 wherein the sliding element surrounds an entire circumference of the respective bearing element.

5. The steering gear of claim 3 wherein the sliding element includes lubrication pockets for lubricating oil.

6. The steering gear of claim 3 wherein the sliding element is connected positively to the respective bearing element via a plug connection.

7. The steering gear of claim 3 wherein the sliding element is connected directly to the respective bearing element via a plug connection.

8. The steering gear of claim 1 comprising an adjusting device that abuts one of the two bearing elements, wherein the respective bearing element that abuts the adjusting device is movable by way of the adjusting device in a radial direction toward the coupling rod, wherein the adjusting device pretensions the respective bearing element.

9. The steering gear of claim 1 wherein the first and second bearing elements are substantially circular-cylindrical.

10. The steering gear of claim 1 wherein one of the two bearing elements is configured in a substantially V-shaped manner on a side near to the coupling rod so as to correspond to a profile of the coupling rod.

11. The steering gear of claim 1 wherein one of the two bearing elements is configured in a substantially V-shaped manner on a side nearest the coupling rod so as to correspond to a profile of the coupling rod.

12. A steering gear for a steer-by-wire steering system of a motor vehicle, the steering gear comprising:
 a pressure piece that includes two bearing elements; and
 a coupling rod movably mounted in a steering gear housing along a longitudinal axis by way of the pressure piece, wherein the two bearing elements of the pressure piece are disposed on opposite sides of the coupling rod in a circumferential direction of the longitudinal axis; and
 a threaded spindle of a helical gearing disposed on a first end region of the coupling rod, wherein the coupling rod is movably mounted in the steering gear housing by way of the pressure piece in a second end region that opposes the first end region along the longitudinal axis, and wherein a profile of the coupling rod in the second end region is non-circular, and wherein a diameter of the profile in the second end region is smaller than a diameter of the first end region.

13. The steering gear of claim 12 wherein the helical gearing is a ball screw drive.

14. A steering gear for a steer-by-wire steering system of a motor vehicle, the steering gear comprising:
 a pressure piece that includes two bearing elements;
 a coupling rod movably mounted in a steering gear housing along a longitudinal axis by way of the pressure piece, wherein the two bearing elements of the pressure piece are disposed on opposite sides of the coupling rod in a circumferential direction of the longitudinal axis; and
 a threaded spindle of a helical gearing disposed on a first end region of the coupling rod, wherein the coupling rod is movably mounted in the steering gear housing by way of the pressure piece in a second end region that opposes the first end region along the longitudinal axis, and wherein a profile of the coupling rod in the second end region is non-circular, and wherein a cross-sectional area of the coupling rod in the second end region is smaller than a cross-sectional area of the coupling rod in the first end region.

\* \* \* \* \*